US008720264B2

(12) United States Patent
Knudsen et al.

(10) Patent No.: US 8,720,264 B2
(45) Date of Patent: May 13, 2014

(54) PERFORMANCE OF PERMANENTLY INSTALLED TUBING CONVEYED SEISMIC ARRAYS USING PASSIVE ACOUSTIC ABSORBERS

(75) Inventors: Sverre Knudsen, Oslo (NO); Paul Travis, Aberdeenshire (GB)

(73) Assignee: Weatherford/Lamb, Inc., Houston, TX (US)

( * ) Notice: Subject to any disclaimer, the term of this patent is extended or adjusted under 35 U.S.C. 154(b) by 666 days.

(21) Appl. No.: 12/296,048

(22) PCT Filed: Apr. 6, 2007

(86) PCT No.: PCT/US2007/066173
§ 371 (c)(1),
(2), (4) Date: Mar. 5, 2010

(87) PCT Pub. No.: WO2007/118210
PCT Pub. Date: Oct. 18, 2007

(65) Prior Publication Data
US 2010/0230093 A1    Sep. 16, 2010

Related U.S. Application Data

(60) Provisional application No. 60/744,394, filed on Apr. 6, 2006.

(51) Int. Cl.
*E21B 47/10*    (2012.01)
(52) U.S. Cl.
USPC .......... 73/152.36; 181/207; 181/175; 367/57; 367/83; 166/66; 166/113

(58) Field of Classification Search
USPC ......... 166/13, 66, 113; 175/50; 181/102, 105, 181/207, 175; 367/57, 83, 85; 73/152.34, 73/152.36
See application file for complete search history.

(56) References Cited

U.S. PATENT DOCUMENTS

| 2,826,066 | A  | * | 3/1958  | Piety ........................... 73/152.34 |
| 3,692,080 | A  | * | 9/1972  | Boileau ......................... 152/527 |
| 3,876,314 | A  | * | 4/1975  | Nehring ........................ 401/133 |
| 5,005,666 | A  |   | 4/1991  | Fairborn |
| 6,799,638 | B2 | * | 10/2004 | Butterfield, Jr. .............. 166/386 |
| 2002/0043369 | A1 | * | 4/2002 | Vinegar et al. ........... 166/250.07 |

FOREIGN PATENT DOCUMENTS

| GB | 2 253 054 | 8/1992 |
| GB | 2 305 244 | 4/1997 |
| GB | 2 339 908 | 2/2000 |

(Continued)

OTHER PUBLICATIONS

British Examination Report dated Apr. 7, 2009.

(Continued)

*Primary Examiner* — Yong-Suk Ro
(74) *Attorney, Agent, or Firm* — Patterson & Sheridan, LLP

(57) ABSTRACT

Methods and apparatus for reducing the impact of guided (or "tube") waves in permanently installed seismic systems. By utilizing passive acoustic absorbers, the impact of tube waves may be reduced, leading to improved performance of permanently installed seismic systems that are installed onto production tubing when the well is completed.

11 Claims, 7 Drawing Sheets

(56) References Cited

FOREIGN PATENT DOCUMENTS

| | | |
|---|---|---|
| GB | 2394774 | 5/2004 |
| JP | 53-043601 | 4/1978 |
| JP | 63-282683 A | 11/1988 |
| JP | 09-152487 A2 | 6/1997 |
| JP | 10-062555 A2 | 3/1998 |
| JP | 2002-506978 | 3/2002 |

OTHER PUBLICATIONS

Japanese Office Action for Application No. P2009-0504496, dated May 2, 2011.

International Search Report for International Patent Application No. PCT/US2007/066173, dated Jan. 9, 2008.

* cited by examiner ated PERFORMANCE OF PERMANENTLY
INSTALLED TUBING CONVEYED SEISMIC
ARRAYS USING PASSIVE ACOUSTIC
ABSORBERS

CROSS-REFERENCE TO RELATED APPLICATIONS

This application claims benefit of U.S. Provisional Patent Application Ser. No. 60/744,394, filed Apr. 6, 2006, which is herein incorporated by reference.

BACKGROUND OF THE INVENTION

1. Field of the Invention

Embodiments of the present invention generally relate to seismic sensing applications and, more particularly, to improved performance of permanently installed tubing conveyed seismic arrays using passive acoustic absorbers.

2. Description of the Related Art

In borehole seismic surveys waves generated by a seismic source do not only propagate directly from the source to the receiver, but may also travel along other paths. This may lead to undesired waves acting as noise and obscuring both the downgoing and upgoing body wavefields that are recorded in borehole seismic surveys. At low frequencies and with vertical seismic profiling (VSP) surveys using conventional wireline techniques, these undesired waves are often referred to as tube waves, propagating in the well as guided waves.

The subject of many studies, tube waves are dominated by the Stoneley mode and by a compressional wave considered as a limiting case of the Biot slow wave (Marzetta, 1985; Norris, 1987). The situation is completely different when using permanent tubing conveyed downhole seismic sensors. Introduction of tubing within the fluid-filled borehole makes the tube wave propagation more complex. Investigation of these low frequency tube waves in a production well has been done through field tests and theoretical approaches (Jacques, P., Ong, H., Jupe, A., and Brown, I., 2003, "Permanent downhole seismic sensors in flowing wells," 73rd Ann. Internat. Mtg.: Soc. of Expl. Geophys., Expended Abstract, 2282-2284; and Ziatdinov, S., Bakulin, A., Kashtan, B., Golovnina, Z., and Korneev, V., 2005, "Tube waves in producing wells with tubing and casing," 75th Ann. Internat. Mtg.: Soc. of Expl. Geophys., Expended Abstract, 332-335).

Accordingly, what is needed is a mechanism to reduce the impact of tube waves and improve performance of permanently installed seismic systems that are installed onto production tubing when the well is completed.

SUMMARY OF THE INVENTION

Embodiments of the present invention generally provide methods and apparatus for reducing the impact of guided (or "tube") waves in permanently installed seismic systems, such as those that are installed onto production tubing when a well is completed.

One embodiment of the present invention provides an apparatus for blocking unwanted acoustic waves in the annular region of a completion. For some embodiments, such an apparatus may reduce pipe modes in production tubing. For some embodiments, such an apparatus may reduce acoustic emission from the production tubing due to production and flow of hydrocarbons.

Another embodiment of the present invention provides a completion system. The completion system generally includes production tubing, a plurality of seismic sensors deployed in a wellbore with the production tubing; and one or more devices configured to shield the seismic sensors from at least one of unwanted acoustic waves and pipe vibrations.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Embodiments of the present invention generally provide methods and apparatus for reducing the impact of guided (or "tube") waves in permanently installed seismic systems. By utilizing passive acoustic absorbers, the impact of tube waves may be reduced, leading to improved performance of permanently installed seismic systems that are installed onto production tubing when the well is completed.

Fluid pressure pulsations and mechanical vibrations in well completion systems may cause excessive noise. The excitation mechanism can be hydraulic and/or mechanical. In fluid-filled well completion systems pulsations and vibrations may be strongly coupled. Coupling between each mechanical element and the fluid plays a fundamental role.

Coupling Noise to Sensors

Figure 1:
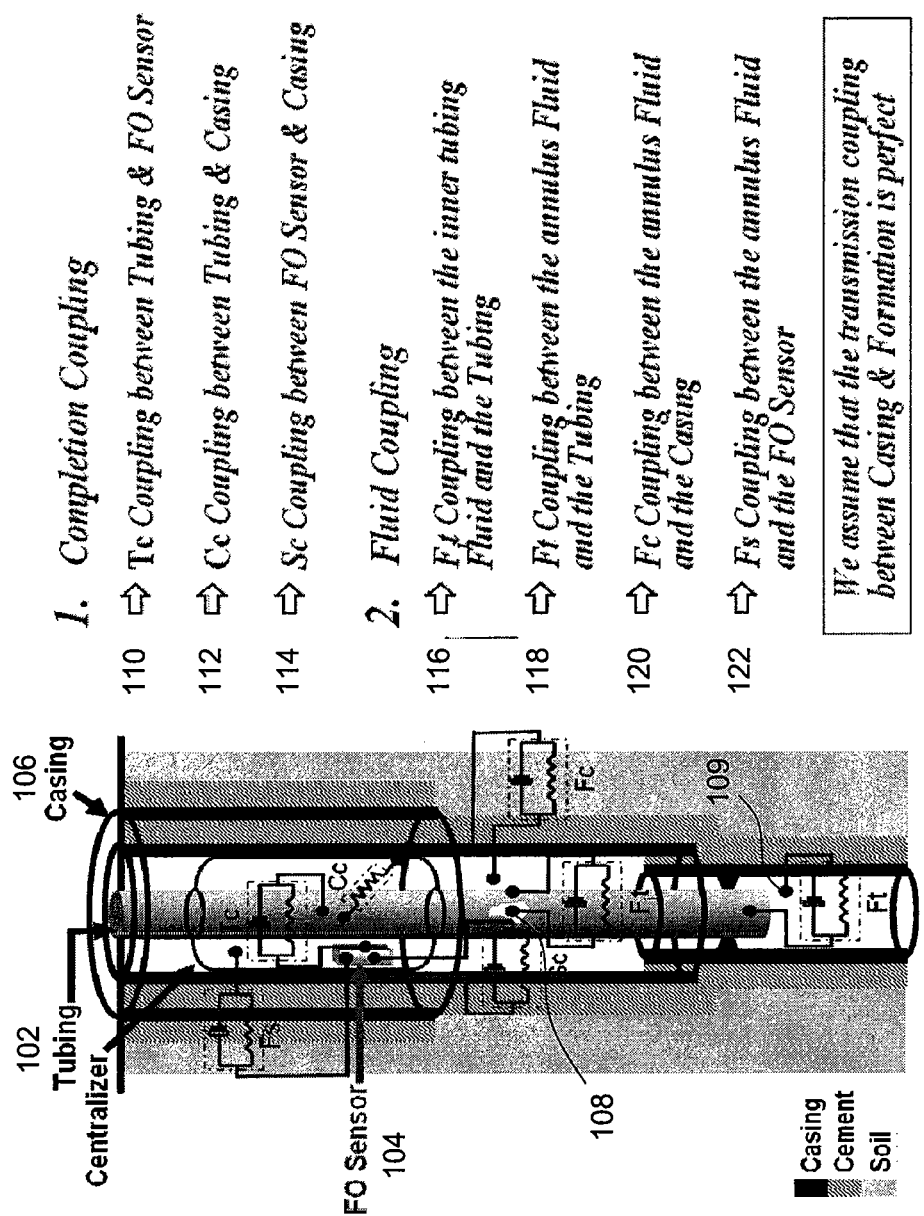
FIG. 1 illustrates completion and fluid coupling acting on a permanent fiber optic three-component (3-C) seismic system.

When considering production-tubing-conveyed permanent seismic sensors, the noise generated by the fluid pulsations can be transmitted to the casing-coupled sensor in many different ways as portrayed in FIG. 1. These means may be grouped according to two categories: completion coupling (mechanical coupling) and fluid coupling.

As used herein, completion coupling generally refers to the coupling of the mechanical vibrations. Thus, completion coupling may include: (1) coupling 110 between the production tubing 102 and a fiber optic (FO) 3-C sensor 104 (e.g., as occurs through the sensor-to-tubing attachment device) labeled "Tc," (2) coupling 112 between the production tubing 102 and the well casing 106 (e.g., as occurs through the tubing centralizers) labeled "Cc," and (3) coupling 114 between the FO sensor 104 and the well casing 106 (e.g., by means of the sensor-to-casing contact points) labeled "Sc." The mechanical coupling between the casing 106 and the surrounding formation 100 may be assumed to be perfect.

As used herein, fluid coupling generally refers to fluid pulsations inside the tubing and in the annulus coupled with the completion. Therefore, fluid coupling may include: (1) coupling 116 between the inner tubing fluid 108 and the tubing 102 labeled as "$F_t t$," (2) coupling 118 between the annulus fluid 109 and the tubing labeled as "Ft," (3) coupling 120 between the annulus fluid 109 and the casing 106 labeled as "Fc," and (4) coupling 122 between the annulus fluid 109 and the FO sensor 104 labeled as "Fs." The borehole environment may be considered as a porous medium (as described in Norris, A. N, 1987, "The tube wave as a Biot slow wave." Geophysics, 52, p. 694-696.).

Completion Movement

Mechanical movement of the casing 106, tubing 102, or sensor 104 may behave according to a set of coupled differential equations. For casing, tubing, or sensor movement, the differential equations are typically as follows:

$$[Ico]\frac{\partial^2}{\partial t^2}[u, U, S, M, W] + [Rco]\frac{\partial}{\partial t}[u, U, S, M, W] = [\alpha co]\nabla[\nabla(u, U, S, M, W)] - [\mu co]\nabla \wedge [\nabla \wedge (u, S, M)]$$

where u is the displacement vector of the casing with respect to an absolute frame of reference; S is the displacement vector of the fiber optic sensor relative to the casing; M is the displacement vector of the tubing relative to the casing; U is the displacement vector of the annulus fluid relative to the casing; and W is the displacement vector of the inner tubing fluid relative to the tubing 102. For casing movement, $[I_{co}]=[I_c]$ is the inertial coupling matrix relative to the casing and $[R_{co}]=[R_c]$ is the viscous coupling matrix relative to the casing.

For tubing movement, $[I_{co}]=[I_t]$ is the inertial coupling matrix relative to the tubing and $[R_{co}]=[R_t]$ is the viscous coupling matrix relative to the tubing.

For sensor movement, $[I_{co}]=[I_s]$ is the inertial coupling matrix relative to the sensor and $[R_{co}]=[R_s]$ is the viscous coupling matrix relative to the sensor.

Fluid Movement

For either annulus fluid movement or inner tubing fluid movement, the differential equations are typically as follows:

$$[Ifl]\frac{\partial^2}{\partial t^2}[u, U, S, M, W] + [Rfl]\frac{\partial}{\partial t}[u, U, S, M, W] = [\alpha fl]\nabla[\nabla(u, U, S, M, W)]$$

where, for annulus fluid movement, $\lfloor I_{fl} \rfloor=[I_a]$ is the inertial coupling matrix relative to the annulus fluid and $\lfloor R_{fl} \rfloor=[R_a]$ is the viscous coupling matrix relative to the annulus fluid. For inner tubing fluid movement, $\lfloor I_{fl} \rfloor=[I_i]$ is the inertial coupling matrix relative to the inner tubing fluid and $\lfloor R_{fl} \rfloor=[R_i]$ is the viscous coupling matrix relative to the inner tubing fluid. The relative movement between fluid (annulus and inner tubing) and completion (casing, tubing, and sensor) is dependant on the effectiveness of the inertial coupling and the viscous coupling. This effectiveness is a function of the critical frequency $f_c$ (depending on the borehole environment characteristics including those of the formation) which governs the crossover between viscous coupling and inertial coupling. The lower the excitation frequency relative to $f_c$, the more negligible the inertial coupling may be.

The higher the excitation frequency relative to $f_c$, the more negligible the viscous coupling may be. Because the critical frequency $f_c$ is relatively low in a borehole environment, the fluid viscosity can be considered as negligible, and then $[R_{co}]=[R_{fl}]=0$. The whole equation system consists of five degrees of freedom. To optimize noise attenuation, the sensor may be decoupled as efficiently as possible (except for the coupling with the formation through the casing), the number of degrees of freedom may be reduced, and/or the effect of the undesirable wavefields may be dampened.

Sources of Complex Waves

The principal source of borehole mechanical vibrations may be the surface ground roll or Rayleigh wave through its coupling with the completion system including the fluid column of the tubing, the annulus fluid, the casing, and the tubing. The second source of excitation may be body waves (e.g., P-waves and S-waves) depending on the characteristics of the porous medium surrounding the borehole. Due to geometric complexity of the completion when using permanent-tubing-conveyed seismic sensors, each excitation mode may provide different types of waves more or less coupled as tube waves, pipe modes, resonance, etc.

Some elementary mechanisms such as fluid movement generate what is called a tube wave by producing: a tube "respiration" giving a low frequency compressional wave or slow Biot wave, interface waves such as pseudo-Rayleigh or Stoneley, and guided waves, because a fluid-filled borehole is a waveguide; and a tube "flexion" with flexural waves.

In soft formations, when a shear wave is hitting the borehole, strong resonances in the fluid can occur at low frequencies and at an angle of incidence where the vertical wavenumber of the shear wave is equal to the tube wave wavenumber at which the tube wave is excited (see Peng, C., Cheng, C. H., and Toksöz, 1993, "Borehole effects on downhole seismic measurements." Geophysics, 41, p. 883-912).

Figure 2:
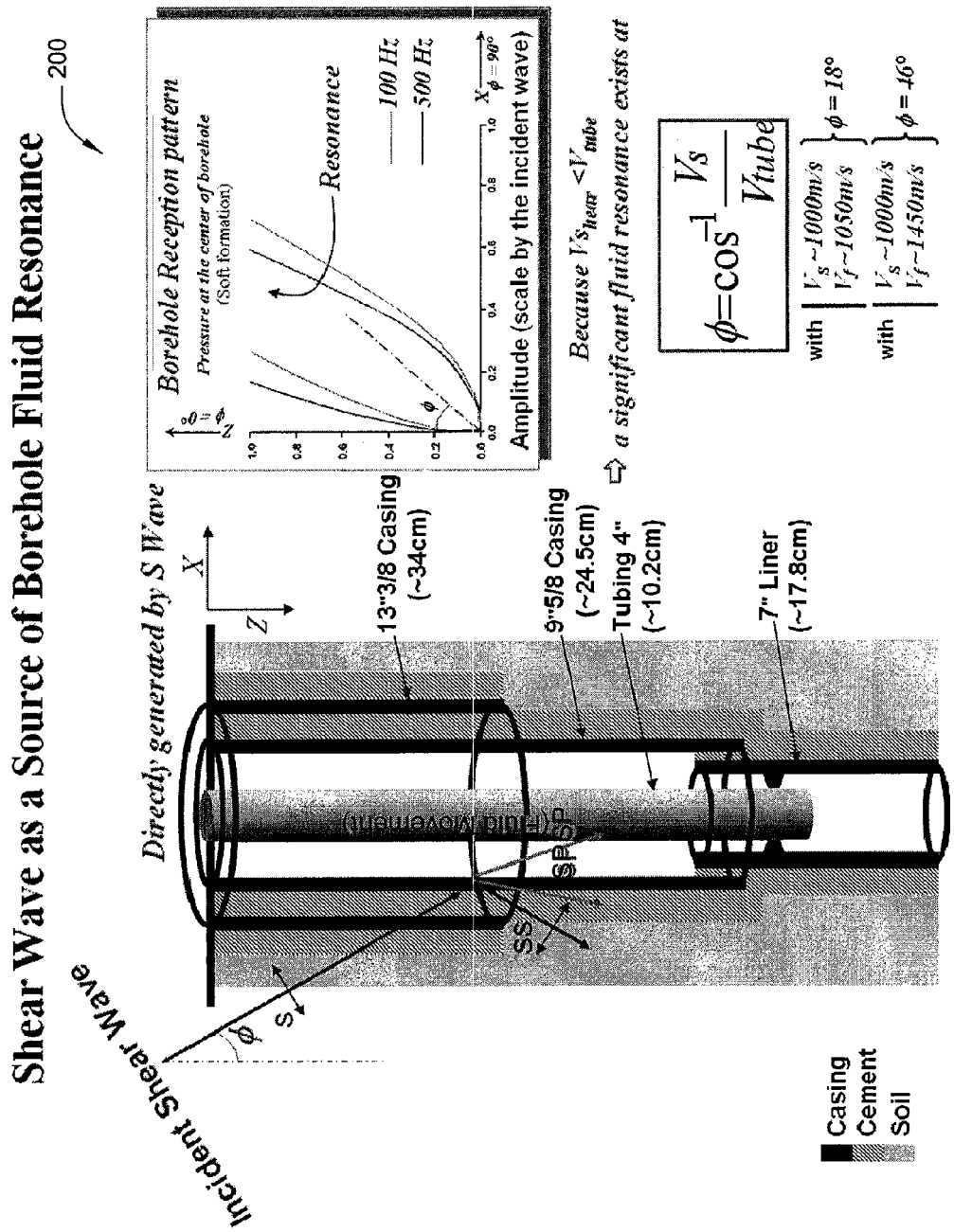
FIG. 2 illustrates a view of a borehole reception pattern with a shear wave as an incident plane wave.

FIG. 2 represents the borehole reception pattern 200 for pressure at the center of a fluid column at two different frequencies 100 Hz and 500 Hz. The borehole is assumed as infinite and surrounded by a homogeneous elastic medium, and the shear wave velocity ($V_S$) is lower than the tube wave velocity ($V_{tube}$).

In fluid-filled pipe systems, pressure pulsations and mechanical vibrations are strongly coupled. The structure (i.e., the casing plus the annulus fluid) surrounding the pipe system (i.e., the tubing plus the inner tubing fluid) may interact with fluid pulsations and mechanical vibrations depending on how the elements are coupled together. Considering the completion (i.e., the structure and the pipe system) just as an effective medium comparable to a simple organ pipe with rigid ends, the eigenfrequencies are given by $$fn = \frac{V_{completion}}{2l}(n+1/2)$$

where $V_{completion}$ is the effective velocity of the whole completion when each element of the completion is perfectly coupled and l is the effective completion length. At this time, $V_{completion}$, is lower than each component alone (tubing, casing, or fluid). $V_{completion}$ can take several values when components are not perfectly coupled. These vibrations produce not only guided waves, but also typically vertical modes, radial modes, and flexural modes which are referred to as pipe modes.

Field Test Analysis and Interpretation

Analysis of field tests may require identification of the complex waves, which are typically identified by their characteristics of propagation: amplitude, polarization (particle motion) and/or velocity. For instance, tube waves generally have a larger amplitude than body waves, polarization is elliptical, and velocity can be lower than a shear wave in some porous media, typically close to the surface. Field tests were conducted in a gas storage site in the onshore Aquitaine Basin (southwestern France). A permanent, five station, 3-C fiber optic (FO) seismic array was fixed on completion tubing of 4-in. diameter (see Bostick, F. X., Knudsen, S., Nakstad, H., Blanco, J., and Mastin, E., 2003, "Permanently installed fiber optic multi-station 3-C in-well seismic trial at Izaute field." EAGE 65$^{th}$ Conference and Technical Exhibition, Stavanger) and actively coupled with the formation through two cemented casings, one of 9⅝-in., the other 13⅜-in. The "active" station was also substantially decoupled from the completion tubing using a unique method of springs and acoustically isolated guide posts. For comparison, a single 3-C seismic sensor station was fixed directly to the completion tubing. This "passive" station was attached very close to the shallowest active station and was decoupled with the casing and thus with the formation. The objective of the passive station is to better identify the waves coming from the tubing vibrations.

A brush system designed as a tube wave suppressor was mounted between the casing and the tubing above, below, and between the stations to reduce the annulus fluid column movement. Walkaway vertical seismic profile (VSP) data was recorded with a spatial sampling interval of 10 m, and the seismic source was a Nomad 65 vibrator. The vibrator was driven with a 12-sec upsweep starting at 10 Hz and ending at 210 Hz. Different sweep configurations were used including log sweep, linear sweep, and hyperbolic sweep to study the impact on the ground roll and on the shear waves.

Brush System

Figure 3:
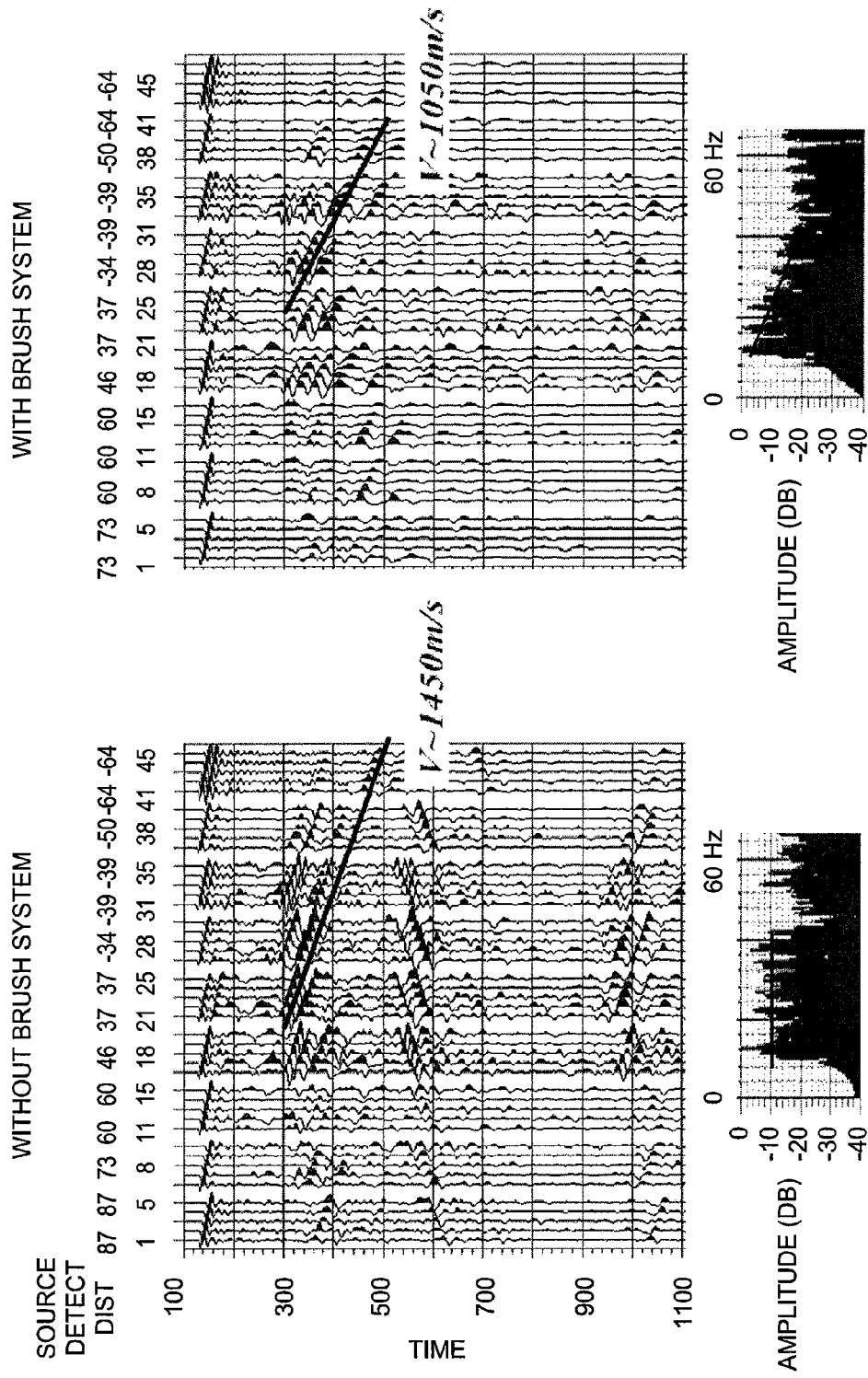
FIG. 3 illustrates common source gather of walkaway vertical seismic profiling (VSP) data without and with a guided wave suppressor in accordance with embodiments of the present invention.

A test was performed first without and then with the brush system using the same source and recording system in both surveys. The results are shown in FIG. 3. With the brush system, three modifications were typically observed: (1) the tube wave amplitude decreases significantly as the frequency increases, (2) tube wave reflections and multiples are strongly reduced, and (3) the tube wave velocity is lower.

By adding the brush system, the effective medium compartmentalizing the annulus fluid column has been considerably modified. Two alternative interpretations could explain these results: (1) the annulus fluid column may be considered as completely isolated and motionless as a consequence of using the brush system, and what is observed may mainly be due to the vibrations of the tubing with its inner fluid; and (2) the annulus fluid may be moving for frequencies up to 40 Hz because the brush system is also moving at these low frequencies, and beyond 40 Hz, the brush system and the annulus fluid column stay motionless.

Active and Passive Systems

The test comparing the response of both active and passive stations to the same walkaway VSP survey aims to better differentiate the various components of the complex wavefield, particularly pipe modes, and to estimate their impact on body waves.

Figure 4:
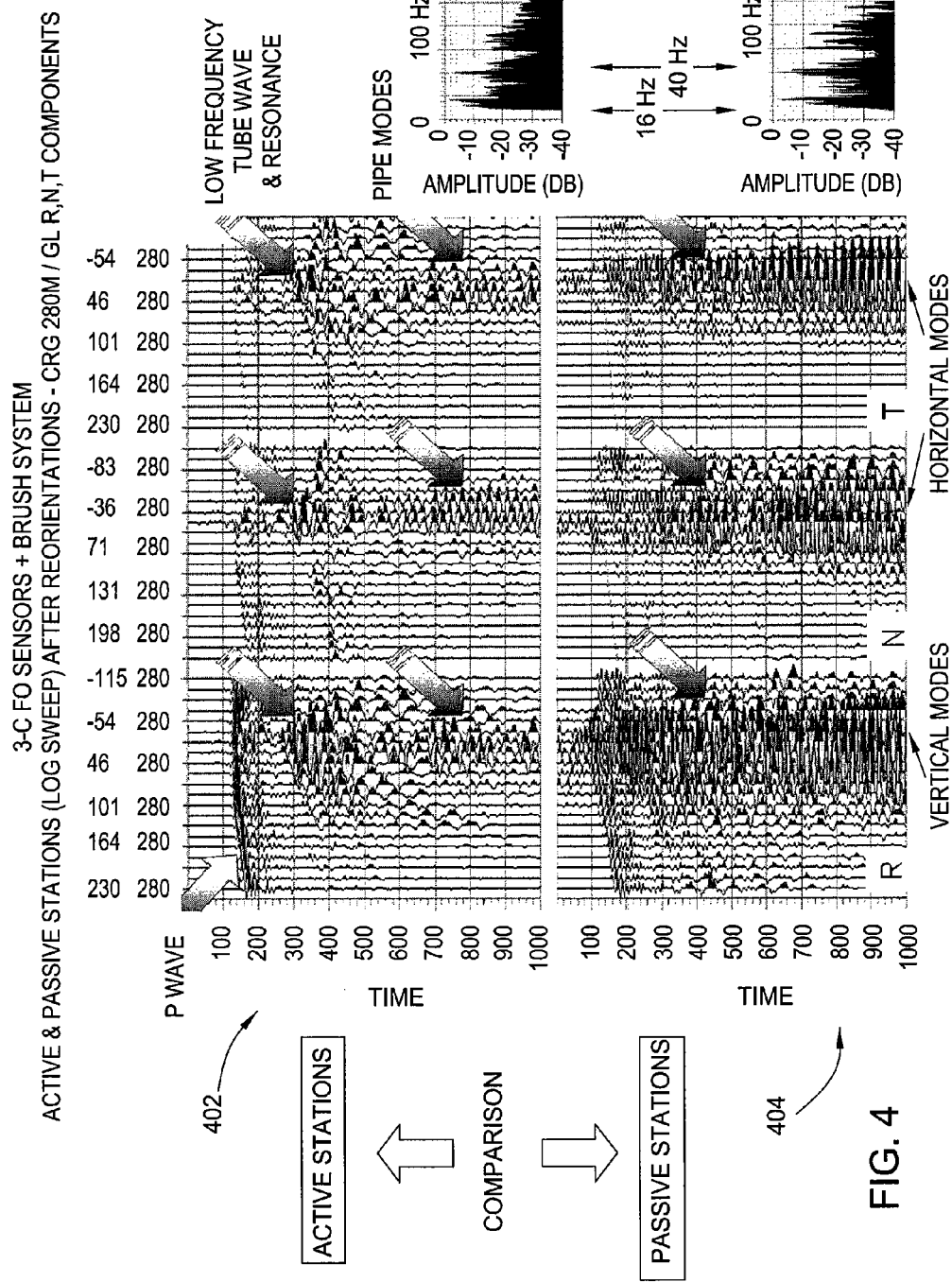
FIG. 4 illustrates a comparison between active and passive seismic stations with a guided wave suppressor along RTN coordinate components in accordance with embodiments of the present invention.

FIG. 4 shows a comparison between active 402 and passive 404 datasets for the same common receiver gather (CRG) with radial (R), normal (N), and tangential (T) components according to a heliographic coordinate system. The analysis is based on the use of the amplitude ratio between body waves and tube waves or pipe modes.

The significant pipe mode reduction with the active station data 402, as compared to P-wave energy, is clearly visible. This decrease is largely due to the fact that the active station coupling between tubing and FO sensors is considerably less than the coupling between casings and FO sensors. The two first pipe mode frequencies, clearly identified on the passive station 404, are 16 Hz and 40 Hz, respectively (see the frequency spectrum). These modes may correspond to vibrations coming from the upper part of the tubing when it is free from surface to 258 m depth.

Sweep Tests

Figure 5:
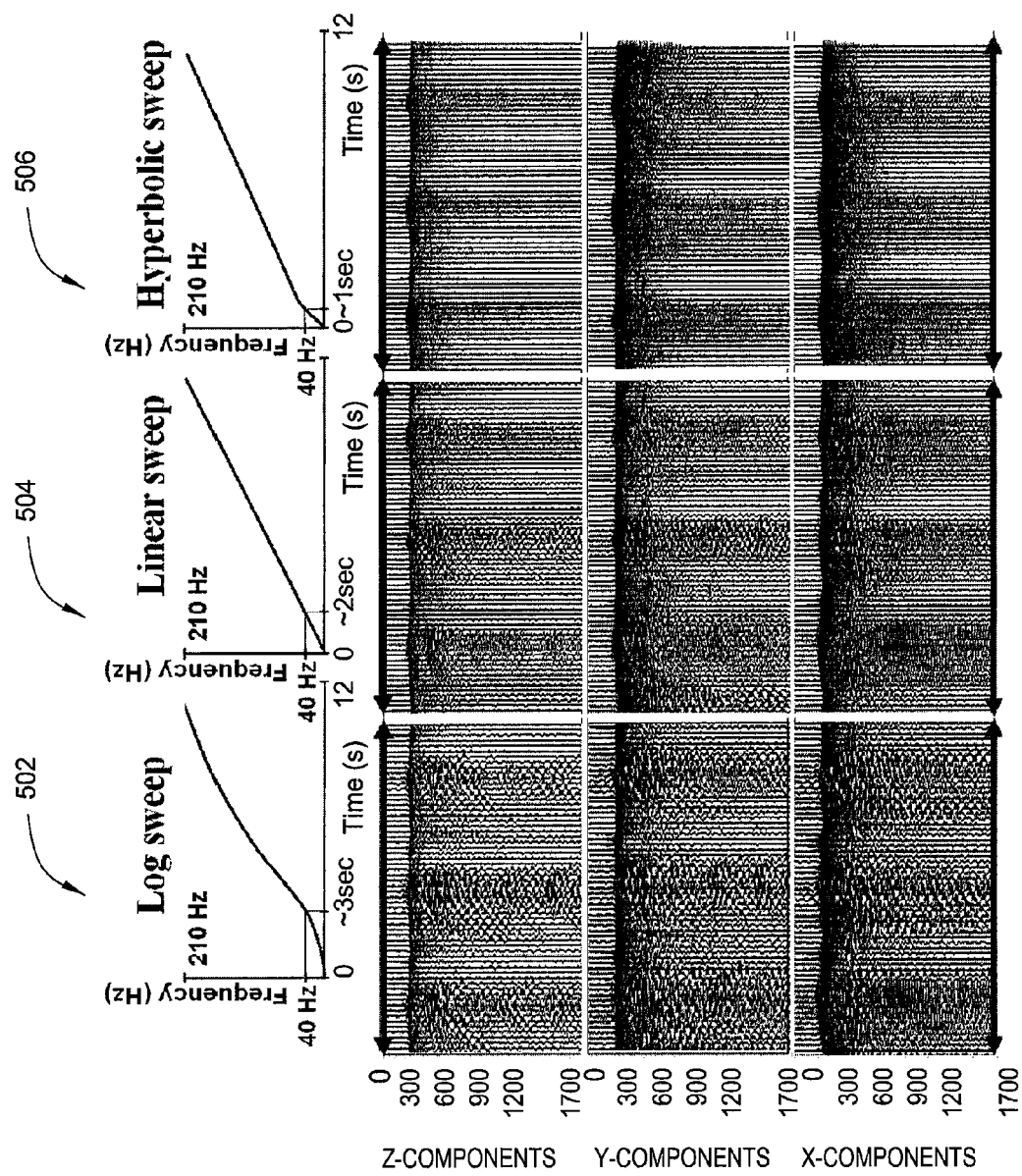
FIG. 5 illustrates sweep tests in common receiver gather (CRG) showing log, linear, and hyperbolic sweeps in accordance with embodiments of the present invention.

Depending on the surface medium, the ground roll, and the shear wave energy generated by a seismic source can be different according to the frequency. Referring now to FIG. 5, three vibrator tests were performed with a log sweep 502, a linear sweep 504, and a hyperbolic sweep 506. The comparison between each survey result shows that the ground roll and the shear waves are even the least energetic when the low frequency sweep duration is short (i.e., with hyperbolic sweep 506).

An understanding of the theoretical coupling mechanisms together with the field test results demonstrates that it is possible to determine the origin of complex wavemodes in a well completion and the impact on tubing-conveyed seismic sensors. These unwanted or noisy waves may be dependent on the way the different elements of the completion are coupled together.

To neutralize this seismic noise, decoupling between each element of the completion and sensing system may be employed. The survey procedure should also focus on reducing the noisy sources such as ground roll and/or shear waves by choosing appropriate seismic energy source parameters.

For some embodiments, sensor systems may be provided that try and achieve the best conditions for seismic imaging and monitoring in various seismic completion designs. Reducing the level of unwanted tube waves will most likely help in some cases.

An Exemplary Passive Acoustic Absorber

The following provides a description of the principle of using passive acoustic absorbers in an effort to improve performance of permanently installed seismic systems that are installed onto production tubing when the well is completed. An example of a typical completion is illustrated, and the acoustic absorbers are also described.

Figure 6:
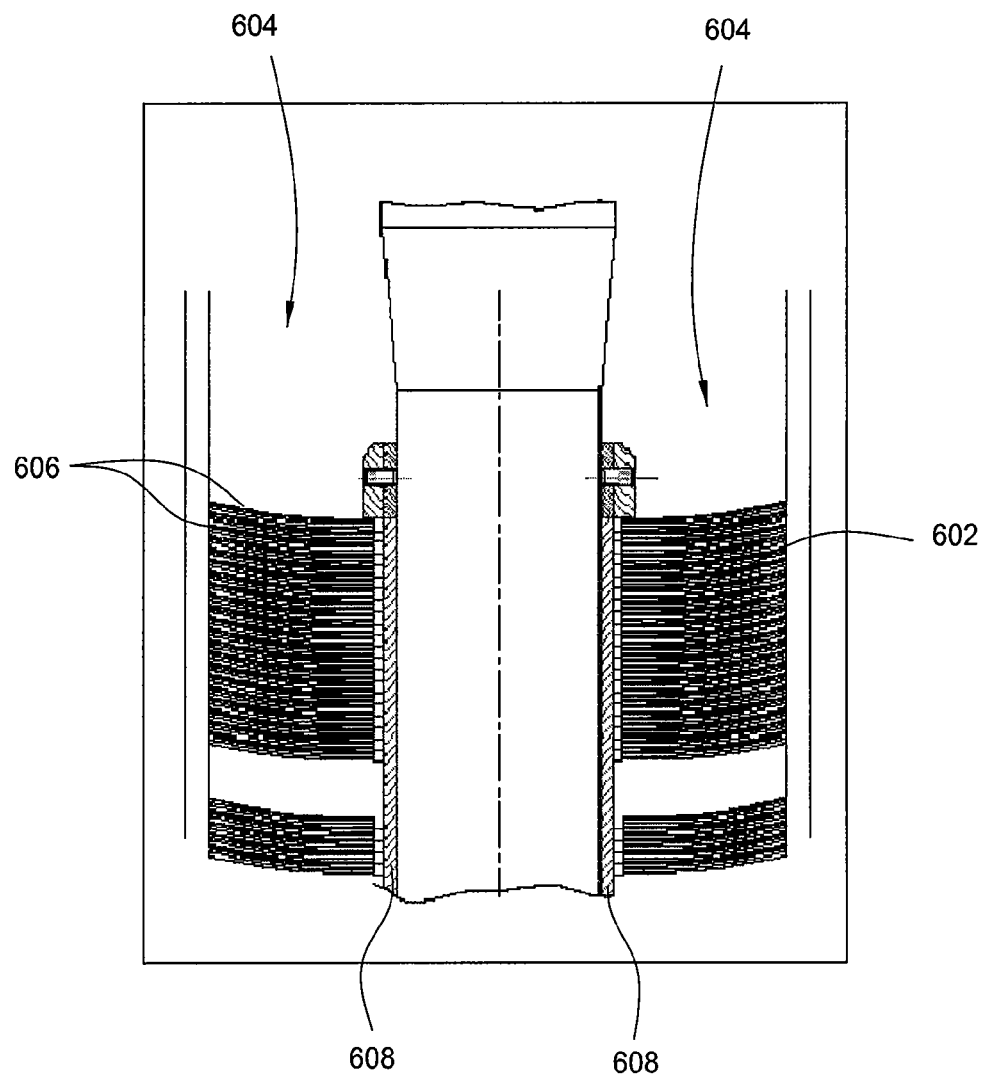
FIG. 6 illustrates an exemplary tube wave suppressor in accordance with embodiments of the present invention.

For permanently installed seismic systems installed along the production tubing into the annular region of the well, where the seismic sensors are in contact with the casing, a common problem encountered is unwanted complex acoustic and pipe vibrations associated with the production tubing itself. One way to reduce both pipe vibrations and also guided annular waves may to insert one or more acoustic absorbers close to the seismic sensors in an effort to suppress these unwanted waves, considered as noise. An example of such a device, a so-called tube wave suppressor 602, is illustrated in FIG. 6.

The tube wave suppressor 602 may possess a high acoustic impedance contrast within the seismic detection band relative to the well fluid (not shown) in the annular region 604. The tube wave suppressor 602 may consist of brushes 606 with monofilament fibers to obtain said high acoustic impedance contrast ratio with the well fluid and satisfactory acoustic loss properties. The monofilament fibers may be disposed in a metal core 608 wound on a circular form as shown. With such a desirable impedance contrast, the unwanted guided waves may be reflected and/or absorbed by the suppressor 602 disposed around the seismic sensors and may thus not be seen by the sensor. Other benefits that may be obtained with the same suppressor 602 may include reducing the acoustic and mechanical vibration properties of the hole completion close to the seismic array, and thus, such noise sources as pipe mode and also acoustic emission due to production noise may be reduced.

An Exemplary Well Completion Using Acoustic Absorbers

Figure 7:
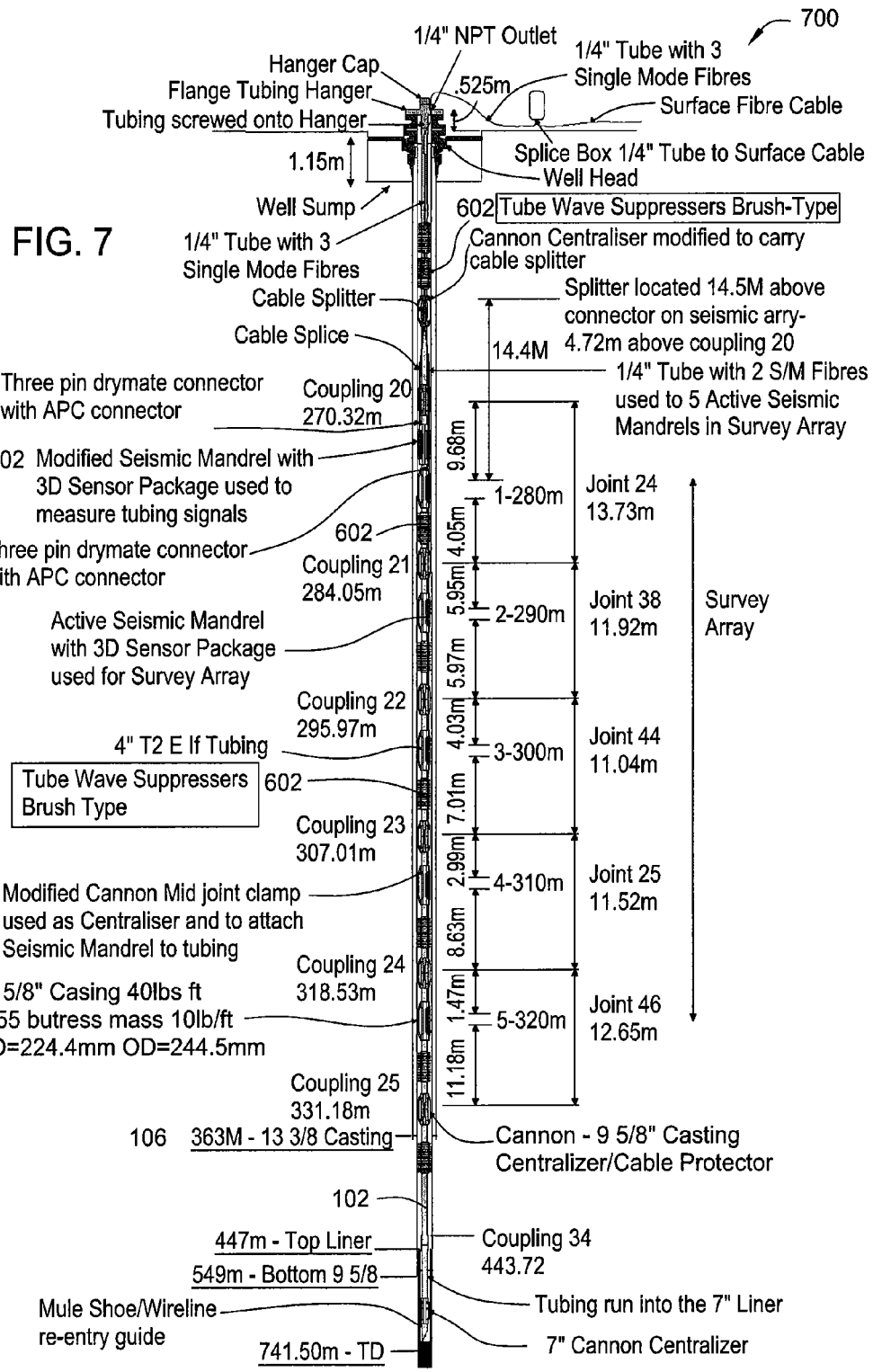
FIG. 7 illustrates an exemplary well completion utilizing tube wave suppressors in accordance with embodiments of the present invention.

FIG. 7 illustrates a typical well completion diagram 700 of a seismic array where tube wave suppressors 602 are used. The tube wave suppressors 602 (brush type devices are shown) may be adapted and located, such as around seismic mandrels 702 with sensor packages used to measure tubing signals, in an effort to block unwanted acoustic waves in the annular region of typical completions.

The tube wave suppressors 602 may also reduce pipe modes in the production tubing 102. The devices may also reduce acoustic emission from the production tubing due to production and flow of hydrocarbons. For some embodiments, suppressors 602 may include monofilament fibers in metal core wound on a circular form, as shown in FIG. 6, and may provide high acoustic impedance contrast. The fiber material may be selected to survive operating and installation conditions and increase acoustic contrast in an effort to reduce tube waves.

While the foregoing is directed to embodiments of the present invention, other and further embodiments of the invention may be devised without departing from the basic scope thereof, and the scope thereof is determined by the claims that follow.

The invention claimed is:

1. An apparatus configured at least to reduce at least one of unwanted acoustic waves and pipe vibrations in an annular region of a completion well bore system, the apparatus comprising a plurality of brushes comprising bristles composed of monofilament fibers, wherein the monofilament fibers are disposed in a metal core wound on a circular form.

2. The apparatus of claim 1, wherein the unwanted acoustic waves are tube waves.

3. The apparatus of claim 1, wherein the brushes absorb the at least one of the unwanted acoustic waves and the pipe vibrations.

4. The apparatus of claim 3, wherein the brushes have a high acoustic impedance contrast relative to fluids in the annular region.

5. The apparatus of claim 1, wherein the monofilament fibers comprise a material selected to survive operating and installation conditions.

6. A completion system, comprising:
   production tubing;
   a plurality of seismic sensors deployed in a wellbore with the production tubing; and
   one or more devices configured to shield the seismic sensors from at least one of unwanted acoustic waves and pipe vibrations, wherein the one or more devices comprise brushes having bristles composed of monofilament fibers, wherein the monofilament fibers are disposed in a metal core wound on a circular form.

7. The completion system of claim 6, wherein the unwanted acoustic waves are tube waves.

8. The completion system of claim 6, wherein the one or more devices are disposed adjacent to the seismic sensors along the production tubing.

9. The completion system of claim 6, wherein the one or more devices have a high acoustic impedance contrast within a detection bandwidth of the seismic sensors relative to fluid in an annular space surrounding the production tubing.

10. The completion system of claim 6, wherein the one or more devices reflect or absorb the unwanted acoustic waves or the pipe vibrations.

11. The completion system of claim 6, wherein the monofilament fibers comprise a material selected to survive operating and installation conditions.

\* \* \* \* \*

UNITED STATES PATENT AND TRADEMARK OFFICE
CERTIFICATE OF CORRECTION

PATENT NO. : 8,720,264 B2  
APPLICATION NO. : 12/296048  
DATED : May 13, 2014  
INVENTOR(S) : Knudsen et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1279 days.

Signed and Sealed this

Twenty-ninth Day of September, 2015

Michelle K. Lee
*Director of the United States Patent and Trademark Office*